Patented Nov. 15, 1932

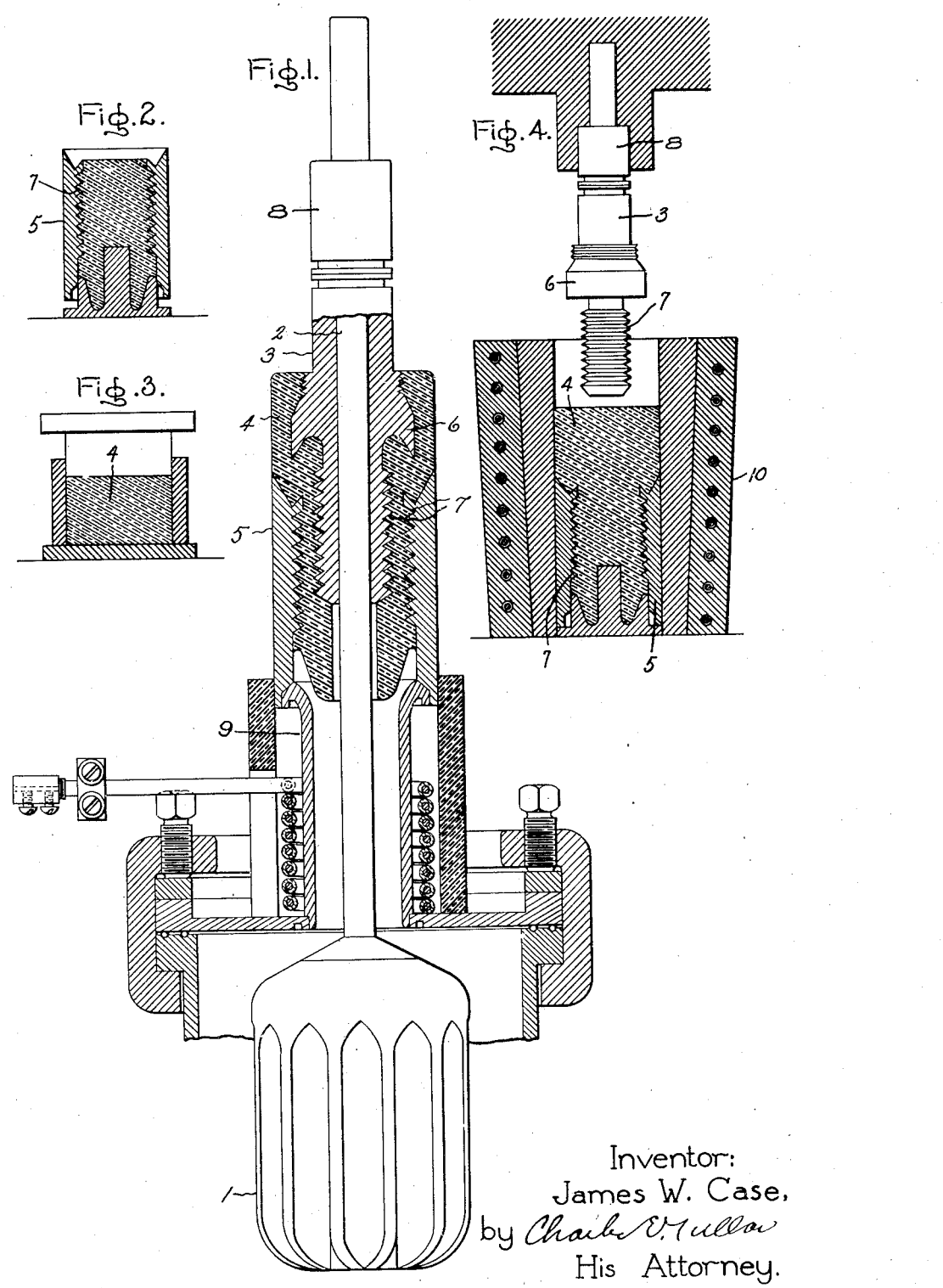

1,888,071

UNITED STATES PATENT OFFICE

JAMES W. CASE, OF SCHENECTADY, NEW YORK, ASSIGNOR TO GENERAL ELECTRIC COMPANY, A CORPORATION OF NEW YORK

SEAL FOR ELECTRIC DISCHARGE DEVICES

Application filed December 28, 1929. Serial No. 417,239.

My invention relates to gas impervious seals and has for its principal object the provision of an improved seal for electric discharge devices such as mercury arc rectifiers.

One of the most difficult problems encountered in the development of high capacity mercury arc rectifiers is the construction of a simple and rugged seal which may be completely assembled in the factory, will withstand the necessarily rough usage to which it is exposed during installation and will remain gas-tight under repeated variations in temperature. Various attempts along this line have been made, but the seals produced have not been altogether satisfactory for the reason that they tend to develop leaks and produce unsatisfactory operation of the apparatus.

In accordance with my invention, a vitreous compound composed of a suitable mixture of mica and lead borate and capable of tenaciously adhering to the surfaces of the metal parts of the seal is forced in between these parts under predetermined conditions hereinafter set forth.

My invention will be better understood from the following description when considered in connection with the accompanying drawing, and its scope will be pointed out in the appended claims.

Referring to the drawing, Fig. 1 illustrates, in cross section, a seal made in accordance with my invention; and Figs. 2 to 4 illustrate different steps in the construction of the seal.

This seal includes a metal core or insert 3 and a metal sleeve 5 between which is interposed a vitreous compound 4. The metal core 3 is suitably machined at the top for the attachment preferably by welding of a metal terminal 8 into which is screwed a metal rod 2 arranged to support and conduct current to an electrode 1. The sleeve 5 is machined for the attachment of a sleeve 9 by which the seal is connected to the rectifier casing of the device.

The vitreous compound 4 is composed of a mixture of approximately 50% ground mica and approximately 50% lead borate. In forming the compound, the lead borate and finely ground mica are heated in an oven for a short time to drive off the excess oxygen contained in the lead borate ingredients. A very small amount of water is then added so that the powder may be pressed together in a cold state. A suitable amount of this powder is then forced into the sleeve 5 (see Fig. 2) and into a cylindrical mold (see Fig. 3). The sleeve 5 and mold are then heated in an oven to a temperature at which the compound becomes plastic. At the same time, the core 3 is heated to a temperature of approximately 75° C. above that of the other parts of the seal. After the various parts have been brought to the proper temperature, the sleeve containing the heated material is placed in an electrically heated mold 10 (see Fig. 4) which is at a temperature substantially 200° below that of the oven in which the sleeve is heated. The cylindrical body 4 of the vitreous compound is then placed on the top of the sleeve 5 so that it will form the top of the insulation body interposed between the shell and the core. The core is then removed from the oven and pressed down into the plastic material until it comes to rest in the position illustrated in Fig. 1 of the drawing. The whole seal is then held in the mold at a high pressure for substantially one-half hour during which the mold is allowed to cool.

It has been found that this method of procedure gives the vitreous compound a permanent set and causes it to thoroughly wet all the surfaces of the metal core and sleeve so that a tight seal is formed. In order to reduce the liability of leaks at the metal surfaces, the core 3 and sleeve 5 are serrated, as illustrated at 7, thus increasing the length of the leakage surface. As will be readily understood, the flange 6 serves both to increase the leakage surface and to compress the vitreous compound into the space between the sleeve and the core.

It has been found that in order to successfully form a seal of this character, the absence of oxide on the metal parts is necessary. Due to the fact that the inner surface of the sleeve is covered with the vitreous compound while being heated, no oxide is formed on this surface. The metal core 3, however, is heated without a protective covering and is preferably made of a non-oxidizing metal which has a coefficient of expansion so related to the coefficient of expansion of the vitreous compound and of the metal sleeve as to avoid the production of strain between the different parts of the seal.

In selecting the metals of the seal, it is, therefore, necessary to take into consideration the temperatures to which the different parts of the seal are subjected during its operation.

It has been found that with a sleeve made of mild steel and a core made of an iron alloy containing about 25% chromium, the relative movement between the vitreous compound and the core and sleeve is reduced to a minimum under the usual operating conditions of mercury arc rectifiers.

The method of making a gas tight seal in accordance with the present invention is claimed in a copending application Serial No. 609,524 filed May 5, 1932 which is a division of my present application.

What I claim as new and desire to secure by Letters Patent of the United States, is:—

1. A seal including a metallic sleeve, a substantially non-oxidizing metal core and a vitreous compound including mica and lead borate interposed between said shell and core, the surfaces of said core and shell being wet by the vitreous compound.

2. A seal including a sleeve of mild steel, a core of an iron alloy containing approximately 25% chromium and a vitreous compound including a powdered mica and lead borate interposed between said sleeve and said core, the surfaces of said core and sleeve being wet by said vitreous compound.

3. A seal including a metallic sleeve, a substantially non-oxidizing metal core and a vitreous compound including substantially 50% powdered mica and 50% lead borate interposed between said core and sleeve.

4. In a gas impervious seal, a metallic sleeve provided with serrations upon its inner surface, a substantially non-oxidizing metal core provided with serrations and a curved flange, and a vitreous compound consisting substantially of mica and glass arranged to adhere to the surfaces of said core and sleeve and arranged to be compressed by said flange.

5. The combination in a mercury arc device, of an evacuated metallic casing, an electrode mounted therein, and a seal including a metallic sleeve connected to said casing, a substantially non-oxidizable metal core connected to said electrode and a vitreous compound including mica and lead borate interposed between said sleeve and core, the surfaces of said core and sleeve being wet by said vitreous compound, the metal of said core having a coefficient of expansion so related to the coefficients of expansion of said compound and of said metal sleeve that said seal operates without strain between said compound and said core and sleeve.

6. The combination in a mercury arc device, of an evacuated metallic casing, an electrode mounted therein, and a seal including a metallic sleeve connected to said casing, a core formed of an iron alloy and a vitreous compound including powdered mica and lead borate interposed between said sleeve and said core, the surfaces of said core and sleeve being wet by said vitreous compound, said alloy of said core containing approximately 25% chromium and said sleeve being formed of mild steel whereby movement between said compound and said core and between said compound and sleeve due to the different temperatures of said compound, core and sleeve is reduced substantially to zero.

In witness whereof, I have hereto set my hand this 27th day of December, 1929.

JAMES W. CASE.